United States Patent [19]

Burns

[11] Patent Number: 5,025,075

[45] Date of Patent: * Jun. 18, 1991

[54] METHYLPOLYSILANES AND METHOD FOR THEIR PREPARATION

[75] Inventor: Gary T. Burns, Midland, Mich.

[73] Assignee: Dow Corning Corporation, Midland, Mich.

[*] Notice: The portion of the term of this patent subsequent to Jun. 11, 2008 has been disclaimed.

[21] Appl. No.: 222,897

[22] Filed: Jul. 22, 1988

[51] Int. Cl.$^5$ .............................................. C08G 77/04
[52] U.S. Cl. ...................... 528/33; 528/14; 528/29; 501/88
[58] Field of Search ................ 528/29, 37, 14; 501/88

[56] References Cited

U.S. PATENT DOCUMENTS

| Re. 31,447 | 11/1983 | Baney et al. | 264/65 |
|---|---|---|---|
| 3,165,494 | 1/1965 | Smith | 260/37 |
| 4,298,558 | 11/1981 | Baney et al. | 264/65 |
| 4,310,651 | 1/1982 | Baney et al. | 528/21 |
| 4,618,551 | 10/1986 | Stolka et al. | 430/58 |
| 4,667,046 | 5/1987 | Frey et al. | 556/430 |

OTHER PUBLICATIONS

Ryan et al., 84 J. Amer. Chem. Soc. 4730 (1962).
Watanabe et al., J. C. S. Chem. Comm. 534(1977).
Watanabe et al., J. C. S. Chem. Comm. 704(1977).
Watanabe et al., 128 J. Organo Metallic Chem. 173 (1977).
Watarabe et al., J. C. S. Chem. Comm. 1029 (1978).
Watarabe et al., 218 J. Organo metallic Chem. 27 (1981).
Watanabe et al., 244 J. Organo metallic Chem. 329 (1983).
Atwell, et al., 7 J. Organometallic Chem. 71 (1967).

Primary Examiner—Edward A. Miller
Attorney, Agent, or Firm—Killworth, Gottman, Hagan & Schaeff

[57] ABSTRACT

A process for the preparation of a methylpolysilane having a controlled carbon content is provided which includes the steps of heating together to form a reaction mixture at least one alkoxy-functional disilane selected from the group consisting of disilanes having two, three, and four alkoxy groups bonded to the silicon atoms, and mixtures thereof, with either an alkoxy-functional silane having at least one unsaturated substituent or an unsaturated hydrocarbon compound in an amount effective to increase the carbon content of the resulting polymer. The reaction is carried out in the presence of a catalyst which is a source of alkoxide ions. The methylpolysilane polymers produced may be pyrolyzed to form ceramic compositions having increased carbon contents. The ceramics may find use as films, fibers, and coatings, as well as the many other uses to which silicon carbide ceramics have heretofore been put.

21 Claims, No Drawings

5,025,075

METHYLPOLYSILANES AND METHOD FOR THEIR PREPARATION

BACKGROUND OF THE INVENTION

The present invention relates to the preparation of methylpolysilanes, and more particularly to a method of preparing methylpolysilanes by a catalyzed redistribution of alkoxydisilanes, and the methylpolysilanes produced thereby.

In recent years, workers in the art have developed procedures for the preparation of silicon carbide ceramic materials from polymeric silane precursors such as methylpolysilanes. Silicon carbide possesses a number of desirable properties such as chemical inertness, semiconducting properties, extreme hardness and stability at very high temperatures. Accordingly, silicon carbide ceramics have found use in electrical heating units, furnace walls, mufflers, abrasives, rocket nozzles, and automotive and turbine engine parts. Further, it has been found that the use of polymeric precursors permits the formation of fibers and thin films or coatings of silicon carbide which were heretofore extremely difficult to form using inorganic sources of silicon carbide.

Baney et al, U.S. Pat. No. 4,310,651, teach a procedure for the preparation of methylpolysilanes having halogen substituents through a catalyzed redistribution reaction utilizing tetrabutylphosphonium chloride as the catalyst. The Baney et al process has the advantage of being able to utilize as a starting material the process residue from the direct synthesis of organochlorosilanes. Direct synthesis of organochlorosilanes involves passing the vapor of an organic chloride over heated silicon and a catalyst. See, Eaborn, Organosilicon Compounds, Butterworths Scientific Publications, 1960, page 1. This residue contains a mixture of di-, tri-, and tetra-substituted halodisilanes. However, the halogen substituents on the methylpolysilanes of the Baney et al process have resulted in some difficulties in handling the compositions which tend to auto-ignite when exposed to oxygen or moisture. Moreover, pyrolysis of the compositions to form ceramics releases large quantities of corrosive HCl or HBr gases which must be handled and properly disposed of.

Baney et al, U.S. Pat. No. 4,298,558, teach an improved procedure which converts the halogen substituents on the methylpolysilanes to alkoxy or phenoxy substituents. However, the improved procedure still requires a two step process of converting halodisilanes to halo-substituted methylpolysilanes and then converting the halogen substituents to alkoxy or phenoxy-substituted compositions.

Other workers have attempted to produce methylpolysilanes by a single step redistribution reaction using methoxydisilane starting materials. For example, Ryan et al, 84 J. Amer. Chem. Soc. 4730 (1962), reported the redistribution of 1,1,2,2-tetramethoxy-1, 2-dimethyldisilane to higher polysilanes in the presence of sodium metal. Watanabe et al, in a series of published reports, taught that metal alkoxide catalysts could be used in the redistribution reaction. See, e.g., Watanabe et al, J. C. S. Chem Comm. (1977) 534; Watanabe et al, J. C. S. Chem. Comm. (1977) 704; Watanabe et al, 128 J. Organometallic Chem. 173 (1977); Watanabe et al, J. C. S. Chem. Comm., (1978) 1029; Watanabe et al, 218 J. Organometallic Chem. 27 (1981); and Watanabe et al, 244 J. Organometallic Chem. 329 (1983).

Atwell et al, 7 J. Organometallic Chem. 71 (1967), have also reported the redistribution of alkoxy disilanes to higher organopolysilanes. However, in the Watanabe and Atwell reports, the higher organopolysilane was either uncharacterized, unidentified, or was of a low molecular weight (less than 6 silicon atoms in the chain).

More recently, Frey et al, U.S. Pat. No. 4,667,046, teach a method for preparing higher molecular weight methylpolysilanes by reacting a trialkoxy-substituted disilane, and optionally a tetraalkoxy-substituted disilane, with a silane having at least one silicon to hydrogen bond in the presence of an alkali metal alkoxide catalyst. The methylpolysilanes are taught to be useful as negative photoresist coatings and ceramic precursors. However, the starting materials of Frey must be separately prepared. Frey does not teach the ability to use the process residue from the direct synthesis process which contains mixtures of di-, tri-, and tetra-substituted materials.

Accordingly, the need still exists in the art for a relatively simple single step process for the production of higher molecular weight methylpolysilanes which are free of halogen substituents. Further, there is still a need in the art for such a process in which readily available, inexpensive starting materials containing difunctional substituted disilanes can be utilized.

SUMMARY OF THE INVENTION

The present invention meets those needs by providing a single step process which utilizes readily available starting materials which are free of halogen substituents to produce novel methylpolysilanes. The methylpolysilanes produced have alkoxy substituents and can be derivatized to produce methylpolysilanes having alkyl, amino, hydrido, as well as halogen substituents. All of these methylpolysilanes are useful as ceramic precursors and can be used to form silicon carbide and SiCN compounds (in the case of amino-substituted precursors).

In accordance with one aspect of the present invention, a process for the preparation of an alkoxy-functional methylpolysilane is provided comprising the steps of heating a mixture of alkoxydisilanes containing two, three, and four alkoxy groups bonded to the silicon atoms, in the presence of a catalyst which is a source of alkoxide ions to form a reaction mixture. The redistribution reaction produces oligomer and longer chain polymeric silanes having greater than seven silicon atoms in the polymer chain. By-produced volatile alkoxysilane monomer materials are separated from the reaction mixture as the polymerization reaction proceeds. The mixture is reacted for a time sufficient for the alkoxy-functional methylpolysilane to form. The catalyst may then be separated from the alkoxy-functional methylpolysilane which has formed by any suitable means such as by dissolving the reaction product in a solvent and filtering to remove the catalyst.

The reaction is preferably carried out at a temperature of between about 200° to about 320° C., at which temperature the volatile monomer by-products may be distilled from the reaction mixture. Most preferably, the reaction is carried out at a temperature of between about 250° to about 300° C. Some care must be taken in the heating of the reaction mixture. It is preferred that the reaction mixture is heated at a rate of between about 1° to about 5° C. per minute.

The catalyst is a source, either directly or indirectly, of alkoxide ions such as an alkali metal methoxide or alkali metal alkoxide having from 1 to 6 carbon atoms. It is preferably present in an amount of between about 0.1 to about 10.0%, and most preferably about 1.0% by weight. The alkoxydisilane starting materials preferably have from 1 to 4 carbon atoms in the alkoxy substituents. Methoxy and ethoxy substituents are most preferred.

In another embodiment of the invention, a process for the preparation of an alkoxy-functional methylpolysilane is provided which includes the steps of heating an alkoxydisilane or mixture of alkoxydisilanes having no silicon to hydrogen bonds and in which at least one of the alkoxydisilanes has at least two alkoxy-functional groups bonded to a silicon atom, in the presence of a catalyst which is a source of alkoxide ions to form a reaction mixture. Volatile alkoxysilane materials, which are distilled off as by-products from the reaction mixture, are removed from the reaction mixture. The mixture is reacted for a time sufficient for alkoxy-functional methylpolysilanes to form. The catalyst is then separated from the alkoxy-functional methylpolysilane which has formed. The alkoxydisilanes used as the starting materials may be a mixture of di-, tri-, and tetra-substituted alkoxydisilanes. Such starting materials are readily available by alkoxylation of the residue obtained from the direct synthesis process for organosilanes.

The process of the present invention produces novel halogen free methylpolysilanes which contain dialkyl silicon groups directly in the polymer backbone structure. This is because the dialkoxy-substituted disilane starting materials react with the catalyst and are incorporated into the polymer backbone. It is believed that in previous processes which used dihalo-substituted disilane starting materials in combination with tri- and tetra-halo-substituted disilanes, those di-substituted materials did not react and were not incorporated into the polymer structure. Rather, they were distilled off from the reaction mixture in unreacted form.

Accordingly, it is an object of the present invention to provide novel halogen free methylpolysilane compositions and a single step process for the production of such methylpolysilanes which utilizes readily available starting materials. This, and other objects and advantages of the present invention, will become apparent from the following detailed description and the appended claims.

DESCRIPTION OF THE PREFERRED EMBODIMENTS

The present invention involves the catalyzed redistribution of certain alkoxy-functional disilane starting materials to form methylpolysilanes having alkoxy substituents and polymer chain lengths of greater than seven silicon atoms. The disilane starting materials include di-, tri-, and tetra- alkoxy substituted materials having from 1 to 4 carbons in the alkoxy group. Methoxy and ethoxy substituted disilanes are preferred.

Suitable disilane starting materials include di-, tri-, and tetra-substituted alkoxy functional disilanes. The alkoxy functional groups may contain from 1 to 4 carbon atoms. Methoxy and ethoxy functional groups are preferred. Specific alkoxy functional disilanes which are suitable for use in the present invention include, but are not limited to, 1,1-dimethoxy-1,2,2,2-tetramethyl disilane, 1,2-dimethoxy-1,1,2,2-tetramethyl disilane, 1,2-dimethyl-1,1,2,2-tetramethoxy disilane, and 1,1,2-trimethoxy-1,2,2-trimethyl disilane.

The alkoxy functional disilanes may be prepared by reacting the corresponding chloro-substituted disilanes with methanol or trimethyl orthoformate in accordance with the procedure taught by Watanabe et al, 128 J. Organometallic Chem. 173 (1977). A ready source of mixtures of chloro-substituted disilanes is a component of the residue from the direct synthesis process for organochlorosilanes. In practice, the disilanes in the residue are separated from monomeric silanes by a simple distillation process.

The redistribution reaction is carried out by treating the alkoxy functional disilane starting materials with an amount of catalyst which is sufficient to initiate the redistribution reaction. This amount is preferably from about 0.1 to about 10.0% by weight, and most preferably about 1.0% by weight, of the catalyst. The catalyst in accordance with the process of the present invention is a nucleophile which is a source, either directly or indirectly, of alkoxide ions.

Direct sources of alkoxide ions includes alkali metal alkoxides such as lithium, potassium, or sodium methoxides or corresponding alkoxides. Preferably, the catalyst selected will have an alkoxide substituent which matches the substituents of the starting material. That is, for example, if methoxy functional disilanes are used as the starting material, an alkali metal methoxide catalyst is preferred. A catalyst capable of generating alkoxide ions in situ may also be used. Examples of suitable catalyst compositions include n-butyl lithium or lithium, potassium, or sodium metal.

Either individual disilane compositions or mixtures thereof may be used as starting materials in the reaction. It is preferred, however, than when di-alkoxy functional disilanes are present in the starting material that at least some amount of tri- or tetra- alkoxy substituted disilanes are also present to provide branching sites on the polymer. The starting material and catalyst are heated as a reaction mixture to a temperature at which by-produced monomeric silanes are distilled off from the redistribution reaction and separated therefrom.

The temperature of the reaction mixture must be sufficiently high to enable distillation and separation of monomeric by-products but not high enough to cause the reaction mixture to gel or solidify. A temperature range of about 200° to about 320° C. is preferred, with temperatures in the range of about 250° to about 300° C. being most preferred. It is believed that the preferred temperature range is higher than that practiced by the art previously. It has been found that where tetra-functional disilanes are used as the starting material, temperatures at the lower end of the range may be utilized. Where di-functional disilanes are used, temperatures at the higher end of the range are preferred.

The reaction may be carried out neat, or in the presence of a solvent such as tetrahydrofuran. The presence of a solvent during the initial stages of the reaction may tend to aid in accelerating the reaction. The solvent may be removed during the latter stages of the reaction. The reaction is carried out in an inert atmosphere. Argon is preferred; however, other inert gases such as nitrogen may be used. The reaction mixture must be protected from exposure either to oxygen or moisture.

The reaction is carried out for a time sufficient for all volatile by-products to be distilled from the reaction mixture. The rate of heating the reaction mixture should be sufficiently slow to enable fractionation of monomers from the trimers and oligomers forming in the reaction mixture. Heating rates of from about 1° to about 5° C. per minute have been found to be suitable.

After the redistribution reaction forming the novel methylpolysilanes is completed, the catalyst may be removed from the polymer by any suitable means. A preferred method of removal is by dissolving the polymer in a solvent which will not react with the methylpolysilane polymer such as for example, toluene, tetrahydrofuran, acetonitrile, or saturated hydrocarbons such as hexane or heptane. The solution may then be filtered to remove any catalyst.

The process of the present invention provides halogen free methylpolysilanes having an alkoxy functionality which can be used as ceramic precursors such as binders or carriers for ceramic powders or formed into fibers by either melt or dry spinning techniques. The presence of di-functional alkoxy disilanes in the starting material incorporates dialkyl silicon groups directly into the polymer backbone. Prior processes using dihalo-functional disilanes could not incorporate such di-functional disilanes into the polymer as the dihalo-functional disilanes would not react. The methylpolysilanes of the present invention are also useful as photoresists, coatings for electronic devices, and coatings for ceramic articles to improve oxidation and thermal stabilities as well as wear resistance. The methylpolysilanes may also find use as infiltrants for composite articles.

The halogen free methylpolysilanes may be used directly, or may be derivatized by reacting the alkoxy functionality to provide methylpolysilanes with other functional groups. These may include reaction with an organo alkali metal such as methyl lithium to substitute alkyl groups for the alkoxy groups, reaction with a Grignard reagent (RMgBr) to substitute alkyl or vinyl groups for the alkoxy groups, or reaction with an alkali metal hydride to substitute hydrido groups for the alkoxy groups. Additionally, if desired, a chloro or halogen functionality may be introduced by reacting with an acetyl chloride or halide. An amino functionality may then be introduced into the methylpolysilanes by reacting the chloro or halogen groups with an amine such as monomethylamine.

The novel methylpolysilanes may be pyrolyzed to form ceramics by heating the polymer in an inert atmosphere at temperatures of from about 1000° to about 1600° C. for about 0.1 to about 4 hours. Depending upon the functional groups on the polymer, silicon carbide as well as SiCN compounds are formed.

In order that the invention may be more readily understood, reference is made to the following examples, which are intended to illustrate the invention, but are not to be taken as limiting the scope thereof.

Unless otherwise stated, all of the manipulations in these Examples were performed in dry glassware under an atmosphere of argon. Toluene was distilled from sodium under argon prior to use. $^1$H NMR spectra were recorded on either a Varian EM 360 or EM 390 spectrometer. FTIR spectra were recorded on a Nicolet 5 DX spectrometer. GPC data were obtained on a duPont Instruments GPC equipped with a Spectra Physics SP4100 Integrator and refractive index and ultraviolet light detectors from duPont Instruments. TGA and TMA data were recorded on a duPont 940 thermomechanical analyzer and an Omnitherm TGA interfaced to an Omnitherm 2066 computer. Gas chromatography was performed on a Varian 3700 GC equipped with a thermoconductivity detector using a $\frac{1}{8}$ inch×13 foot column packed with 15% OV-210 on acid-washed Chromasorb P. Oxygen analysis was performed on a LECO oxygen analyzer equipped with an Oxygen Determinator 316 (Model 783700) and an Electrode Furnace EF100. Silicon was determined by a fusion material to soluble forms of silicon and analyzing the solute for total silicon by atomic absorption spectrometry. Carbon, hydrogen and nitrogen analyses were done on a Control Equipment Corporation 240-XA Elemental Analyzer. All percents are by weight unless otherwise indicated. A methyl group is designated by "Me".

EXAMPLE 1

A 1,2-dimethyl-1,1,2,2-tetramethoxydisilane was prepared using a modification of the procedure taught by Watanabe et al, 128 J. Organometallic Chem. 173 (1977). 1428 g (13.46 mole) of trimethyl orthoformate was added dropwise to 672 g (2.95 mole) of 1,2-dimethyl-1,1,2,2-tetrachlorodisilane at 100° C. After all of the trimethyl orthoformate was added (approximately 6 hours) the temperature was increased to 120° C. and the reaction held at this temperature for 2 days. Fractional distillation of the reaction mixture at 80°–90° C./27–35 torr gave 580 g (93.7% yield, 98.5% purity) of syn-$(MeO)_4Si_2Me_2$.

EXAMPLE 2

A mixture of methoxydisilane starting materials was prepared using a modification of the procedure taught by Watanabe et al. 1000 g (9.42 mole) of trimethyl orthoformate was added dropwise to 480 g of methylchlorodisilanes (MCDS) at 130° C. (external thermocouple reading). After all of the trimethyl orthoformate was added (approximately 12 hours), the reaction was held at this temperature for 1.5 days. Fractional distillation of the reaction mixture at 80°–90° C./27–35 torr gave 382 g of product (3.7 area % syn-$(MeO)_2Si_2Me_4$, 32.1 area % $(MeO)_2MeSiSi(OMe)Me_2$ and 62.7 area % syn-$(MeO)_4Si_2Me_2$).

EXAMPLE 3

A methylpolysilane polymer having alkoxy-functional groups was prepared. A 3-neck 1 L round bottom flask fitted with an argon inlet, an overhead mechanical stirrer, an internal thermocouple (connected to a Valley Forge temperature programmer) and an 8" vigreoux connected to a distillation head with a cooled (−78° C.) receiving flask was cooled to 0° C. and 78.0 mL of 1.55M BuLi in hexane (0.121 mole) was added. This was followed by the addition of 4.70 mL (0.116 mole) of absolute methanol. The flask was warmed to room temperature and 382.8 g of the methoxydisilanes prepared in Example 2 added. Under a slow purge of argon, the reaction was heated to 110° C. at 2°/min. The volatiles were collected in the cooled receiving flask. After 30 minutes at 110° C., the temperature was increased at 2°/min. to 180° C. and then cooled to room temperature. During the last heating stage, a thermocouple was placed between the flask and the heating mantle and recorded temperatures up to 290° C. The cooled residue was dissolved in 400 ml of dry, degassed toluene and the toluene solution filtered through a pad of celite on a medium glass frit. Evaporation of the solvent from the filtrate at 190° C. (external thermocouple) at full vacuum gave 72.8 g (19.0% yield) of a yellow, soluble resin. The distillate (358.6 g) consisted of 15.0 area % hexanes, 13.5 area % $Me_2Si(OMe)_2$ and 69.9 area % $MeSi(OMe)_3$.

The polymer was analyzed, and the results are reported below.

$T_g = 35.5°$ C.

TGA (1000° C., $N_2$) = 27.2% residue $^1$H NMR (CDC$_3$), δ (ppm): 0.30 (center of broad singlet, SiMe), 3.35 (center of broad singlet, SiOMe), 3.46 (center of broad singlet, Si-OMe)

SiMe/SiOMe ratio = 4.8/1.0

FTIR (thin film), cm$^{-1}$(intensity): 2953 (m), 2889 (m), 2826 (w), 1406 (w), 1244 (m), 1074 (s), 835 (m), 766 (s), 681 (m)

Elemental Analysis: 32.2% Carbon, 49.4% Silicon, 8.9% Hydrogen.

GPC: Mw = 3212, Mn = 1405

EXAMPLE 4

A methylpolysilane polymer having alkoxy-functional groups was prepared from a mixture of disilane starting materials. A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.80 mL of 1.55M BuLi in hexane (0.0115 mole) was added. This was followed by the addition of 0.40 ml (0.32 g, 0.01 mole) of absolute methanol. The flask was warmed to room temperature and 32.213 g of methoxydisilanes (30.8:42.6 GC area ratio of (MeO)$_2$MeSiSi(OMe)Me$_2$ and syn-(MeO)$_4$Si$_2$Me$_2$) added.

Under a slow purge of argon, the reaction was heated to 300° C. (external termocouple) over a period of 5 hours. The volatiles were collected in the cooled receiving flask. After 30 minutes at 300°, the reaction was cooled to room temperature. The residue was dissolved in 40-50 mL of dry, degassed toluene and the toluene solution filtered through a pad of celite on a medium glass frit. Concentration of the filtrate at reduced pressure gave 5.65 g (17.5% yield) of a yellow, soluble resin. The distillate (23.97 g) consisted of 6.8 area % hexanes, 18.2 area % Me$_2$Si(OMe)$_2$ and 73.0 area % MeSi(OMe)$_3$.

The polymer was analyzed, and the results are reported below.

$T_g = 92.6°$ C.

TGA(1000° C., $N_2$) = 44.6% residue $^1$H NMR (CDCl$_3$), δ (ppm): 0.30(center of broad singlet, SiMe), 3.47 (center of broad singlet, SiOMe), SiMe/SiOMe ratio = 5.4/1.0

FTIR (thin film), cm$^{-1}$(intensity): 2953 (m), 2889 (m), 2834 (m), 2074 (w), 1406 (m), 1244 (m), 1180 (w), 1074 (s), 835 (m), 766 (s), 681 (m), 519 (s)

GPC:$M_w$ = 4775, $M_n$ = 1786

Elemental Analysis: 32.3% Carbon, 55.1% Silicon, 8.6% Hydrogen

EXAMPLE 5

Using the apparatus, catalyst amounts, and isolation procedure of Example 4, a methylpolysilane was prepared using 22.898 g of a mixture of (MeO)$_2$MeSiSi(OMe)Me$_2$ and syn-(MeO)$_4$Si$_2$Me$_2$ (30.8:42.6 GC area ratio) and 5.90 g (0.033 mole) of 1,2-dimethoxytetramethyldisilane. Under a slow purge of argon, the reaction was heated to 340° C. (external thermocouple) over a period of 2-3 hours and then cooled to room temperature. The volatiles were collected in the cooled receiving flask. After work-up 5.31 g (18.4% yield) of a yellow, viscous oil was obtained. The distillate (22.028 g) consisted of 13.8 area % hexanes, 21.4 area % Me$_2$Si(OMe)$_2$, 60.4 area % MeSi(OMe)$_3$ and 1.5 area % of syn-(MeO)$_2$Si$_2$Me$_4$.

The polymer was analyzed, and the results are reported below.

$T_g = <25°$ C.

TGA(1000° C., $N_2$) = 8.2% residue $^1$H NMR (CDCl$_3$), δ (ppm): 0.26(center of broad singlet, SiMe), 3.30 (center of broad singlet, SiOMe), SiMe/SiOMe ratio = 7.4/1.0

FTIR (thin film), cm$^{-1}$(intensity): 2953 (m), 2895 (m), 2826 (w), 2074 (w), 1406 (w), 1244 (s), 1188 (w), 1082 (s), 1032 (m), 835 (m), 766 (s), 519 (s)

GPC:$M_w$ = 1663, $M_n$ = 974

EXAMPLE 6

Using the apparatus, catalyst amounts, and isolation procedure of Example 4, a methylpolysilane was prepared using 31.50 g (0.15 mole) of 1,2-dimethyl-1,1,2,2-tetramethoxydisilane. Under a slow purge of argon, the reaction was heated to 260° C. (external thermocouple) over a period of 2 hours and then cooled to room temperature. The volatiles were collected in the cooled receiving flask. After work-up 5.12 g (16.3% yield) of a yellow, soluble resin was obtained.

The polymer was analyzed, and the results are reported below.

$T_g = >200°$ C.

TGA(1000° C., $N_2$) = 64.4% residue $^1$H NMR (CDCl$_3$), δ (ppm): 0.40(center of broad singlet, SiMe), 3.50 (center of broad singlet, SiOMe), SiMe/SiOMe ratio = 3.1/1.0

FTIR (thin film), cm$^{-1}$(intensity): 2953 (m), 2895 (m), 2834 (m), 1462 (w), 1406 (w), 1244 (m), 1180 (w), 1074 (s), 758 (s), 681 (m), 513 (s)

Elemental Analysis: 32.0% Carbon, 46.8% Silicon, 8.3% Hydrogen

EXAMPLE 7

Using the apparatus, catalyst amounts, and isolation procedure of Example 4, a methylpolysilane was prepared using 31.50 g (0.15 mole) of 1,2-dimethyl-1,1,2,2-tetramethoxydisilane. Under a slow purge of argon, the reaction was heated to 210° C. (external thermocouple) over a period of 2 hours and then cooled to room temperature. The volatiles were collected in the cooled receiving flask. After work-up 5.19 g (16.5% yield) of a yellow, soluble resin was obtained. The distillate (23.97 g) consisted of 13.1 area % hexanes and 85.6 area % MeSi(OMe)$_3$.

The polymer was analyzed, and the results are reported below.

$T_g = >200°$ C.

$^1$ NMR (CDCl$_3$), (ppm): 0.42(center of broad singlet, SiMe), 0.86 (center of broad singlet, SiMe), 3.53 (center of broad singlet, SiOMe), SiMe/SiOMe ratio = 2.9/1.0

FTIR (thin film), cm$^{-1}$(intensity): 2953 (m), 2895 (m), 2834 (m), 2074 (w), 1454 (w), 1406 (w), 1244 (m), 1180 (w), 1074 (s), 758 (s), 681 (m), 519 (s)

Elemental Analysis: 30.6% Carbon, 48.2% Silicon, 8.4% Hydrogen

EXAMPLE 8

An alkoxy-functional methylpolysilane was derivatized to provide methyl-functional groups using an organo alkali-metal reagent. A 3-neck 100 mL round bottom flask fitted with an argon inlet, a stirring bar and a short path distillation head with a cooled (0° C.) receiving flask was charged with 3.34 g of the methypolysilane prepared in Example 4 and 45 mL of dry, degassed toluene. To this solution was added 30 mL of 1.40M (0.042 mole) of a MeLi/Et$_2$O solution. After stirring at room temperature for 2.5 hours, the Et$_2$O was removed by distillation, the pot cooled to 0° C. and 10 mL of a saturated NH$_4$Cl/H$_2$O solution added. This was followed by the addition of 10 mL of degassed H$_2$O. The H$_2$O layer was then drawn off with a syringe and the organic layer dried over MgSO$_4$, then filtered through a pad of celite on a medium glass frit and the filtrate concentrated in vacuo to give 2.24 g (67.1% mass yield) of a yellow, soluble resin.

The polymer was analyzed, and the results are reported below.

$T_g$=97.0° C.

TGA(1000° C., N$_2$)=34.3% residue $^1$H NMR (CDCl$_3$), δ (ppm): 0.26(center of broad singlet, SiMe)

FTIR (thin film), cm$^{-1}$(intensity): 2953 (s), 2889 (s), 2791 (w), 2074 (w), 1406 (m), 1244 (s), 1032 (m), 907 (w), 835 (s), 758 (s), 681 (s)

GPC:M$_w$=3342, M$_n$=1551

EXAMPLE 9

An alkoxy-functional methylpolysilane was derivatized to provide vinyl-functional groups using a Grignard reagent. A 3-neck 250 mL round bottom flask fitted with an argon inlet, a stirring bar and a short path distillation head with a cooled (0° C.) receiving flask was charged with 9.10 g of the methylpolysilane prepared in Example 3 and 100 mL of dry, degassed toluene. The reaction was cooled to 0° C., and 70 mL of 1.0M (0.07 mole) of a ViMgBr/THF solution added over a 30 minute interval. After stirring at 0° C. for 15 minutes, the reaction was warmed to room temperature and stirred for 2.5 hours. The THF was removed by distillation, the pot cooled to 0° C., and 10 mL of a saturated NH$_4$Cl/H$_2$O solution added. The H$_2$O layer was drawn off with a syringe; the organic layer was dried over MgSO$_4$, filtered through a pad of celite on a medium glass frit and the filtrate concentrated in vacuo to give 5.06 g (55.6% mass yield) of a light yellow, soluble resin.

The polymer was analyzed, and the results are reported below.

$T_g$=95.0° C.

$^1$H NMR (CDCl$_3$), (ppm): 0.29(center of broad singlet, SiMe), 5.76(center of broad singlet, SiVi), 5.96(center of broad singlet, SiVi), 6.35(center of broad singlet, SiVi) SiMe/SiVi ratio=6.4/1.0

FTIR (thin film), cm$^{-1}$(intensity): 3052 (w), 2953 (m), 2889 (m), 2791 (w), 2074 (w), 1398 (m), 1244 (m), 1074 (w), 1005 (m), 835 (m), 758 (m), 681 (m), 519 (s)

Elemental Analysis: 40.5% carbon, 49.8% silicon, 9.9% hydrogen

EXAMPLE 10

An alkoxy-functional methylpolysilane was derivatized to provide chloro-functional groups using an acetyl chloride reagent. 19.81 g the methylpolysilane prepared in Example 3 was dissolved in approximately 150 mL of acetyl chloride. The solution was gently refluxed. After four days, the volatiles were removed in vacuo and the residue stripped at 210° C. at full vacuum to provide 15.8 g of a yellow, soluble resin.

The polymer was analyzed, and the results are reported below.

$T_g$=91.8° C.

TGA(1000° C., N$_2$)=17.2% residue $^1$H NMR (CDCl$_3$), δ (ppm): 0.39(center of broad singlet, SiMe), 3.34(center of broad singlet, SiOMe), 3.40(center of broad singlet, SiOMe) SiMe/SiOMe ratio=23.5/1.0

FTIR(thin film, cm$^{-1}$(intensity): 2953 (m), 2895 (m), 2081 (w), 1406 (w), 1250 (m), 1069 (m), 1018 (w), 835 (m), 766 (s), 505 (s)

Elemental Analysis: 27.2% carbon, 47.8% silicon, 7.8% hydrogen, 11.8% chlorine

EXAMPLE 11

An alkoxy-functional methylpolysilane was derivatized to provide hydrido-functional groups using an alkali metal hydride reagent. A 3-neck 1 L round bottom flask fitted with an argon inlet, a stirring bar, a septa and a reflux condesor was charged with 2.3 g of lithium aluminum hydride in 500 mL of dry, degassed Et$_2$O. A solution of 8.69 g of the methylpolysilane prepared in Example 3 in 100 mL of toluene was added over a 15 minute interval. The reaction was refluxed for 36 hours, cooled to room temperature and allowed to stand for 1 day. The Et$_2$O was removed by distillation, the pot cooled to room temperature, and the product filtered through a medium glass frit. The filtrate was washed with 30 mL of a saturated NH$_4$Cl/H$_2$O followed by 20 ml of H$_2$O. The H$_2$O layer was drawn off with a syringe; the organic layer was dried over MgSO$_4$ and filtered through a pad of celite on a medium glass frit. Concentration of the filtrate in vacuo gave 2.00 g (23.0% mass yield) of a light yellow, soluble resin.

The polymer was analyzed, and the results are reported below.

$T_g$=40.1° C.

TGA(1000° C., N$_2$)=21.8% residue $^1$H NMR (CDCl$_3$), δ (ppm): 0.30(center of broad singlet, SiMe), 0.70(center of broad singlet, SiMe), 3.47(center of broad singlet, Si-H), 3.81(center of broad singlet, Si-H) SiMe/SiH ratio=19.8/1.0

FTIR (thin film), cm$^{-1}$(intensity): 2959 (m), 2889 (m), 2797 (w), 2081 (m), 1406 (w), 1244 (m), 1032 (w), 872 (m), 835 (m), 766 (s), 681 (m), 638 (m), 519 (s)

Elemental Analysis: 31.0% carbon, 58.9% silicon, 10.4% hydrogen

GPC: Mw=2768, Mn=1294

EXAMPLE 12

The chloro-functional methylpolysiliane of Example 10 was further derivatized to provide amino-functional groups using an amine reagent. Monomethylamine was rapidly bubbled through a solution of 6.46 g of the methylpolysilane prepared in Example 10 (MPS-Cl) dissolved in approximately 150 mL of dry toluene at −78° C. After 45 minutes, the MeNH$_2$ addition was stopped. The reaction was allowed to warm to room temperature, and the excess MeNH$_2$ was distilled off. The crude product mixture was filtered through a pad of celite on a medium glass frit and the filtrate concentrated in vacuo to give 4.43 g (68.6% mass yield) of a yellow, soluble resin.

The polymer was analyzed, and the results are reported below.

$T_g$=104.4° C.

TGA(1000° C., N$_2$)=22.6% residue $^1$H NMR (d$_8$-toluene), δ (ppm): 0.48(center of broad singlet, SiMe), 2.54 (center of broad singlet, NMe), 3.38 (center of broad singlet, NH)

SiMe/NMe/NH integration ratio = 22.1/2.4/1.0

FTIR (thin film), cm$^{-1}$(intensity): 3416 (w), 2953 (m), 2889 (m), 2805 (w), 2074 (w), 1406 (w), 1369 (w), 1244 (m), 1090 (s), 1018 (m), 835 (m), 766 (s), 681 (m)

GPC: $M_w$=5311, $M_n$=1188

Elemental Analysis: 32.6% carbon, 49.8% silicon, 10.4% hydrogen, 3.8% nitrogen and 2.1% oxygen

EXAMPLE 13

Samples of methylpolsilane polymers prepared in Examples 3-12 were pyrolyzed to demonstrate their utility as ceramic precursors. The samples were weighed into alumina boats inside a VAC inert atmosphere box. The samples were transferred, inside a sealed bag, to a 2" Lindberg tube furnace. The samples were removed from the bag and rapidly transferred into the center of the furnace tube. The furnace tube was evacuated to 0.5 torr and then backfilled with ultra high purity argon. The evacuation/backfilling procedure was repeated two more times. A constant purge of argon was swept through the tube and the samples heated to 1200° C. at 5°/minute with a two hour hold at 1200° C. After cooling to room temperature, the ceramic chars were removed from the furnace, weighed, and portions analyzed for silicon, oxygen, carbon, hydrogen, and nitrogen. The elemental analysis data is summarized in Table 1.

TABLE 1

| Example | Polymer | Char Yield | | 1200° (Argon) Char Analysis | | | |
|---|---|---|---|---|---|---|---|
| | | TGA | Bulk* | Silicon | Carbon | Nitrogen | Oxygen |
| 3 | MPS-OMe | 27.2 | — | — | — | — | — |
| 4 | MPS-OMe | 44.6 | 27.7** | 64.8 | 26.1 | — | 5.62 |
| 5 | MPS-OMe | 8.2 | — | — | — | — | — |
| 6 | MPS-OMe | 64.4 | 57.6 | 64.2 | 23.9 | — | 7.5 |
| 7 | MPS-OMe | — | 52.2 | 65.4 | 22.6 | — | 7.9 |
| 8 | MPS-Me | 34.3 | 25.9 | 59.1 | 29.2 | — | 1.4 |
| 9 | MPS-Vi | 73.5 | 31.4** | 58.1 | 36.0 | — | 1.4 |
| 10 | MPS-Cl | 17.2 | 32.6 | 61.2 | 25.9 | — | 3.2 |
| 11 | MPS-H | 21.8 | 26.6 | 69.8 | 26.2 | — | 0.7 |
| 12 | MPS-NHMe | 22.6 | 33 | 62.6 | 28.4 | 3.2 | 1.4 |

*Pyrolized to 1200° at 5°/minute with a 2 hour hold at 1200° C.
**Some of the sample was lost due to foaming While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for the preparation of an alkoxy-functional methylpolysilane comprising the steps of:
   (a) heating a mixture of alkoxydisilanes containing two, three, and four alkoxy-functional groups bonded to the silicon atoms, in the presence of a catalyst which is a source of alkoxide ions to form a reaction mixture;
   (b) reacting said mixture for a time sufficient for an alkoxy-functional methylpolysilane to form while separating by-produced volatile alkoxysilane materials from said reaction mixture; and
   (c) separating said catalyst from said alkoxy-functional methylpolysilane which has formed.

2. The process of claim 1 in which the reaction is carried out at a temperature of between about 200° to about 320° C.

3. The process of claim 1 in which the reaction is carried out at a temperature of between about 250° to about 300° C.

4. The process of claim 1 in which said reaction mixture is heated at a rate of between about 1 to about 5 degrees C. per minute.

5. The process of claim 1 in which said catalyst is present in an amount of about 1.0% by weight.

6. The process of claim 1 in which said alkoxydisilanes have from 1 to 4 carbon atoms in said alkoxy substituents.

7. The process of claim 1 including the further step of reacting said alkoxyfunctional methylpolysilane with an organo alkali metal compound to form an alkylfunctional methylpolysilane.

8. The process of claim 1 including the further step of reacting said alkoxyfunctional methylpolysilane with a Grignard reagent to form an alkylfunctional methylpolysilane.

9. The process of claim 1 including the further step of reacting said alkoxyfunctional methylpolysilane with an alkali metal hydride to form a hydridofunctional methylpolysilane.

10. The process of claim 1 including the further step of reacting said alkoxyfunctional methylpolysilane with an acetyl halide to form a halofunctional methylpolysilane.

11. The process of claim 10 including the further step of reacting said halofunctional methylpolysilane with an amine to form an aminofunctional methylpolysilane.

12. The process of claim 1 including the step of pyrolyzing said methylpolysilane to form a ceramic composition.

13. A process or the preparation of an alkoxy-functional methylpolysilane consisting essentially of the steps of:
   (a) heating an alkoxydisilane or mixture of alkoxydisilanes having no silicon to hydrogen bonds and in which at least one of the alkoxydisilanes has at least two alkoxy-functional groups bonded to a silicon atom, in the presence of a catalyst which is a source of alkoxide ions to form a reaction mixture;
   (b) reacting said mixture for a time sufficient for an alkoxy-functional methylpolysilane to form while separating by-produced volatile alkoxysilane materials from said reaction mixture; and
   (c) separating said catalyst from said alkoxy-functional methylpolysilane which has formed.

14. The process of claim 13 in which said alkoxydisilanes are a mixture of di-, tri-, and tetra-substituted alkoxydisilanes.

15. The process of claim 13 including the further step of reacting said alkoxyfunctional methylpolysilane with an organo alkali metal compound to form an alkylfunctional methylpolysilane.

16. The process of claim 13 including the further step of reacting said alkoxyfunctional methylpolysilane with a Grignard reagent to form an alkylfunctional methylpolysilane.

17. The process of claim 13 including the further step of reacting said alkoxyfunctional methylpolysilane with an alkali metal hydride to form a hydridofunctional methylpolysilane.

18. The process of claim 13 including the further step of reacting said alkoxyfunctional methylpolysilane with an acyl halide to form a chlorofunctional methylpolysilane.

19. The process of claim 13 including the further step of pyrolyzing said methylpolysilane to form a ceramic composition.

20. A halogen free product produced by the process of claim 1.

21. A halogen free product produced by the process of claim 13.

* * * * *